United States Patent
Flanagan et al.

(10) Patent No.: US 7,292,987 B2
(45) Date of Patent: Nov. 6, 2007

(54) INTEGRATED MULTILINGUAL BROWSER

(75) Inventors: Mary A. Flanagan, Framingham, MA (US); John A. Lammers, Acton, MA (US)

(73) Assignee: America Online, Inc., Dulles, VA (US)

( * ) Notice: Subject to any disclaimer, the term of this patent is extended or adjusted under 35 U.S.C. 154(b) by 0 days.

(21) Appl. No.: 11/059,752

(22) Filed: Feb. 17, 2005

(65) Prior Publication Data

US 2005/0149315 A1 Jul. 7, 2005

Related U.S. Application Data

(63) Continuation of application No. 08/555,916, filed on Nov. 13, 1995, now Pat. No. 6,993,471.

(51) Int. Cl.
*G06F 17/28* (2006.01)
*G06Q 99/00* (2006.01)

(52) U.S. Cl. .................. 705/1; 704/2; 704/5; 704/6; 704/9

(58) Field of Classification Search .............. 364/200, 364/419, 900; 395/752, 753, 751, 755, 756, 395/758; 379/89; 707/10, 5, 536; 704/3, 704/1, 2, 5, 6, 9; 705/1, 50
See application file for complete search history.

(56) References Cited

U.S. PATENT DOCUMENTS

| | | | |
|---|---|---|---|
| 4,774,655 A | 9/1988 | Kollin et al. | 364/200 |
| 4,870,610 A | 9/1989 | Belfer | 364/900 |
| 4,962,452 A * | 10/1990 | Nogami et al. | 704/5 |
| 4,964,030 A * | 10/1990 | Suzuki et al. | 704/6 |
| 5,005,127 A * | 4/1991 | Kugimiya et al. | 704/5 |
| 5,010,486 A | 4/1991 | Suzuki et al. | 364/419 |
| 5,109,509 A | 4/1992 | Katayama et al. | 395/600 |
| 5,140,521 A | 8/1992 | Kozol et al. | 364/419 |
| 5,175,684 A | 12/1992 | Chong | 364/419 |
| 5,243,519 A * | 9/1993 | Andrews et al. | 704/8 |
| 5,268,839 A | 12/1993 | Kaji | 364/419.03 |
| 5,289,375 A | 2/1994 | Fukumochi et al. | 364/419.02 |
| 5,295,068 A * | 3/1994 | Nishino et al. | 704/10 |
| 5,353,221 A | 10/1994 | Kutsumi et al. | 364/419.05 |

(Continued)

FOREIGN PATENT DOCUMENTS

JP 05006396 1/1993

OTHER PUBLICATIONS

"Web Agent related research at the Center for Machine Translation", Michael L. maudlin and John R.R. Leavitt, Aug. 4, 1994, 5 pages, http://www.fuzine.com/lti/pub/singnidr94.*
Business Wire, "Globalink to provide Netscape clients with on-line language translation; Internet to become truly international and multilingual.", Sep. 18, 1995, 2 pages.

(Continued)

*Primary Examiner*—Andrew J. Fischer
*Assistant Examiner*—Cristina Owen Sherr
(74) *Attorney, Agent, or Firm*—Standley Law Group LLP

(57) ABSTRACT

The disclosed system translates into different languages HTML documents available through the World Wide Web. HTML documents are translated by machine translation software bundled in a browser. Alternatively, documents are retrieved as needed, translated, and stored on a Web server so user requests are serviced with a document that has been translated from a different language. The disclosed invention expands usage of the Internet for non-English speakers.

31 Claims, 19 Drawing Sheets

U.S. PATENT DOCUMENTS

| | | | | |
|---|---|---|---|---|
| 5,361,205 A | * | 11/1994 | Nishino et al. | 704/2 |
| 5,373,441 A | | 12/1994 | Hirai et al. | 364/419.02 |
| 5,373,442 A | * | 12/1994 | Kutsumi et al. | 704/4 |
| 5,497,319 A | | 3/1996 | Chong et al. | 364/419.02 |
| 5,548,508 A | * | 8/1996 | Nagami | 704/2 |
| 5,587,902 A | * | 12/1996 | Kugimiya | 704/2 |
| 5,608,622 A | * | 3/1997 | Church | 704/3 |
| 5,675,817 A | * | 10/1997 | Moughanni et al. | 704/3 |
| 5,740,231 A | * | 4/1998 | Cohn et al. | 379/88.22 |
| 5,752,246 A | * | 5/1998 | Rogers et al. | 707/10 |
| 5,822,720 A | * | 10/1998 | Bookman et al. | 704/3 |
| 5,855,015 A | * | 12/1998 | Shoham | 707/5 |
| 6,493,735 B1 | * | 12/2002 | Kumhyr | 715/536 |
| 6,993,471 B1 | * | 1/2006 | Flanagan et al. | 704/2 |

OTHER PUBLICATIONS

CommunicationsWeek International, "Internet to get free translation software to supply translation service via the internet", Nov. 6, 1995, 1 page.

IBM® Technical Disclosure Bulletin, "Hypermedia Translation Tool", vol. 34, No. 10B, Mar. 1992, pp. 198-199.

Michael L. Maudlin and John R.R. Leavitt, "Web Agent Related Research at the Center for Machine Translation", Aug. 4, 1994, 5 pages, http://www.fuzine.com/lti/pub/singnidr94.

Newsbytes News Network, "Computer Translation Service Debuts in Spain Jan. 26, 1994", 2 pages.

Murata, T., et al., "Realtime machine translation system for world wide web", J Journal, XP 002043731, May 1996, 1 page.

* cited by examiner

```
<html>
<head><title>NLT Home</title></head>
<br><center><img src="file:///nl/iowebsrv/server/8100~1.1/server~1/image/nlt.jpg"
height=60 width=640></center>
<hr>
<center><h1></h1></center>
<br><img src="file:///nl/iowebsrv/server/8100~1.1/server~1/image/nltprod.jpg" height=60 width=96>
<h1>NLT Products</h1>
<br><UL><LI><a href="http://www.compuserve.com/cgi-bin/gocserve?CIS:EWCFORUM">World Community
Forum</a></UL>
<br><UL><LI><a href="http://www.compuserve.com/cgi-bin/gocserve?CIS:TRANSLATE">CompuServe Document
Translation Service (CDTS)</a></UL>
<center><h1></h1></center>
<br><img src="file:///nl/iowebsrv/server/8100~1.1/server~1/image/wip.jpg" height=60 width=96>
<h1>Works-In-Progress</h1>
<br><UL><LI><a href="nlttest.htm">Experimental Area (Enter at your own risk...)</a></UL>
<br><UL><LI><a href="llab.htm">Language Lab</a></UL>
<br><UL><LI><a href="mailtran.htm">E-Mail Translation</a></UL>
<br><UL><LI><a href="webtrans.htm">Web Page Translation</a></UL>
```

FROM FIG-2A

```
<center><h1></h1></center>
<br><img src="file:///n|/iowebsrv/server/8100~1.1/server~1/image/fracmtn.jpg" height=80 width=106>
<h1>Proposals</h1>
<br><UL><LI><a href="http://jlammers/n:\projects\proposal\rose_gl.doc">Rose-Colored Glasses</a></UL>
<center><h1></h1></center>
<br><img src="file:///n|/iowebsrv/server/8100~1.1/server~1/image/isle.jpg" height=80 width=106>
<h1>Points of Interest</h1>
<br><UL><LI><a href="http://www.willamette.edu:80/~tjones/Language-Page.html">The Human Languages Page</a></UL>
<br><UL><LI><a href="http://www.ai.mit.edu">MIT Artificial Intelligence Lab</a></UL>
<center><h1></h1></center>
<br><img src="file:///n|/iowebsrv/server/8100~1.1/server~1/image/mailto.gif" height=20 width=27>
<p>Send comments/questions to: </p>
<br><a href="mailto:jlammers@csi.compuserve.com">NLT Mailbox</a>
</body>
</html>
```

FIG-2B

```
{.<html>.}
{.<head>.} {.<title>.}NLT Home{.</title>.} {.</head>.}
{.<br>.}
{.<center>.} {.<img src="file:///n|/iowebsrv/server/8100~1.1/server~1/image/nlt.jpg"
height=60 width=640>.} {.</center>.}
{.<hr>.}
{.<center>.} {.<h1>.} {.</h1>.} {.</center>.}
{.<br>.}{.<img src="file:///n|/iowebsrv/server/8100~1.1/server~1/image/nltprod.jpg" height=60 width=96>.}
{.<h1>.}NLT Products{.</h1>.}
{.<br>.}{.<UL>.}{.<LI>.}{.<a href="http://www.compuserve.com/cgi-bin/gocserve?CIS:EWCFORUM">.} World
Community Forum{.</a>.} {.</UL>.}
{.<br>.}{.<UL>.}{.<LI>.}{.<a href="http://www.compuserve.com/cgi-bin/gocserve?CIS:TRANSLATE">.}
CompuServe Document Translation Service (CDTS){.</a>.}{.</UL>.}
{.<center>.} {.<h1>.} {.</h1>.} {.</center>.}
```

FROM FIG-3A

{.<br>.} {.<img src="file:///n|/iowebsrv/server/8100~1.1/server~1/image/wip.jpg" height=60 width=96>.}

{.<h1>.} Works-In-Progress {.</h1>.}

{.<br>.} {.<UL>.} {.<LI>.} {.<a href="nlttest.htm">.} Experimental Area (Enter at your own risk....) {.</a>.}{.</UL>.}

{.<br>.} {.<UL>.} {.<LI>.} {.<a href="llab.htm">.}Language Lab{.</a>.} {.</UL>.}

{.<br>.} {.<UL>.} {.<LI>.} {.<a href="mailtran.htm">.} E-Mail Translation{.</a>.} {.</UL>.}

{.<br>.} {.<UL>.} {.<LI>.} {.<a href="webtrans.htm">.} Web Page Translation{.</a>.} {.</UL>.}

{.<center>.} {.<h1>.} {.</h1>.} {.</center>.}

{.<br>.} {.<img src="file:///n|/iowebsrv/server/8100~1.1/server~1/image/fracmtn.jpg" height=80 width=106>.}

{.<h1>.} Proposals {.</h1>.}

{.<br>.} {.<UL>.} {.<LI>.} {.<a href="http://jlammers/n:\projects\proposal\rose_gl.doc">.} Rose-Colored Glasses {.</a>.}{.</UL>.}

FROM FIG-3B

{.<center>.} {.<h1>.} {.</h1>.} {.</center>.}

{.<br>.} {.<img src="file:///n|/iowebsrv/server/8100~1.1/server~1/image/isle.jpg" height=80 width=106>.}

{.<h1>.}Points of Interest {.</h1>.}

{.<br>.} {.<UL>.} {.<LI>.} {.<a href="http://www.willamette.edu:80/~tjones/Language-Page.html">.} {.</a>.} {.</UL>.} The Human Languages Page {.<br>.} {.<UL>.} {.<LI>.} {.<a href="http://www.ai.mit.edu">.}MIT Artificial Intelligence Lab {.</a>.} {.</UL>.}

{.<center>.} {.<h1>.} {.</h1>.}{.</center>}

{.<br>.} {.<img src="file:///n|/iowebsrv/server/8100~1.1/server~1/image/mailto.gif" height=20 width=27>.}

{.<p>.}Send comments/questions to: {.</p>.}

{.<br>.} {.<a href="mailto:jlammers@csi.compuserve.com">.}NLT Mailbox {.</a>.}

{.</body>.}

{.</html>.}

FIG-3C

```
{.<html>.}
{.<head>.} {.<title>.}NLT Maison{.</title>.} {.</head>.}
{.<br>.}
{.<center>.} {.<img
src="file:///n|/iowebsrv/server/8100~1.1/server~1/image/nlt.jpg" height=60
width=640>.} {.</center>.}
{.<hr>.}
{.<center>.} {.<h1>.} {.</h1>.} {.</center>.}
{.<br>.} {.<img
src="file:///n|/iowebsrv/server/8100~1.1/server~1/image/nltprod.jpg" height=60 width=96>.}
{.<h1>.}NLT Produits{.</h1>.}
{.<br>.} {.<UL>.} {.<LI>.} {.<a
href="http://www.compuserve.com/cgi-bin/gocserve?CIS:EWCFORUM">.}
Forum Communauté globale {.</a>.} {.</UL>.}
```

FROM FIG-5A

{.<br>.} {.<UL>.}{.<LI>.}{.<a href="http://www.compuserve.com/cgi-bin/gocserve?CIS:TRANSLATE">.} Le Service de Traduction de Document de compuServe (CDTS) {.</a>.}{.</UL>.)

{.<center>.} {.<h1>.} {.</h1>}{.</center>.}

{.<br>.} {.<img src="file:///n|/iowebsrv/server/8100~1.1/server~1/image/wip.jpg" height=60 width=96>.}

{.<h1>}Les travaux-dans-le progrès{.</h1>.}

{.<br>.} {.<UL>.} {.<LI>.} {.<a href="nlttest.htm">.}Le Domaine expérimental (Introduit à votre propre risque...) {.</a>.}{.</UL>.}

{.<br>.} {.<UL>} {.<LI>.} {.<a href="llab.htm">.}Laboratoire de langue {.</a>.} {.</UL>.}

{.<br>.} {.<UL>.} {.<LI>.} {.<a href="mailtran.htm">.}Envoyer un message par courrier électronique la Traduction{.</a>.} {.</UL>.}

{.<br>.} {.<UL>.} {.<LI>.} {.<a href="webtrans.htm">.}La Traduction de Page de toile{.</a>.} {.</UL>.}

FIG-5B

```
{.<center>.}{.<h1>.}{.</h1>.}{.</center>.}

{.<br>.} {.<img
src="file:///n|/iowebsrv/server/8100~1.1/server~1/image/fracmtn.jpg" height=80 width=106>.}

{.<h1>.} Propositions{.</h1>.}

{.<br>.} {.<UL>.} {.<LI>.} {.<a
href="http://jjammers/n:\projects\proposal\rose_gl.doc">.} Verres Elevé-Colorés {.</a>.} {.</UL>.}

{.<center>.} {.<h1>.} {.</h1>.} {.</center>.}

{.<br>.} {.<img
src="file:///n|/iowebsrv/server/8100~1.1/server~1/image/isle.jpg" height=80 width=106>.}

{.<h1>.}Les points d'Intérêt{.</h1>.}

{.<br>.} {.<UL>.} {.<LI>.} {.<a
href="http://www.willamette.edu:80/~tjones/Language-Page.html">.}
La Page de Langues Humaine {.</a>} {.</UL>.}
```

FROM FIG-5C

```
{.<br>.} {.<UL>.} {.<LI>.} {.<a href="http://www.ai.mit.edu">.}MIT le Laboratoire d'Intelligence
Artificiel {.</a>.} {.</UL>.}

(.<center>.) {.<h1>.} {.</h1>.} {.</center>.)

{.<br>.} {{.<img
src="file:///n|/iowebsrv/server/8100~1.1/server~1/image/mailto.gif" height=20 width=27>.}

{.<p>.}Les commente/questions d'envoi à: {.</p>.}

{.<br>.} {.<a href="mailto:jlammers@csi.compuserve.com">.}NLT Boîte à lettres {.</a>.}

{.</body>.}

{.</html>.}
```

FIG-5D

```
<html>
<head><title>NLT Maison</title></head>
<br>
<center><img
src="file:///n|/iowebsrv/server/8100~1.1/server~1/image/nlt.jpg"
height=60 width=640></center>
<hr>
<center><h1></h1></center>
<br><img
src="file:///n|/iowebsrv/server/8100~1.1/server~1/image/nltprod.jpg" height=60 width=96>
<h1>NLT Produits</h1>
<br><UL><LI><a
href="http://www.compuserve.com/cgi-bin/gocserve?CIS:EWCFORUM">Forum Communauté
globale</a></UL>
<br><UL><LI><a
href="http://www.compuserve.com/cgi-bin/gocserve?CIS:TRANSLATE">Le Service de Traduction
de Document de compuServe (CDTS)</a></UL>
<center><h1></h1></center>
```

FROM FIG-6A

```
<br><img
src="file:///n|/iowebsrv/server/8100~1.1/server~1/image/wip.jpg"
height=60 width=96>
<h1>Les travaux-dans-le progrès</h1>
<br><UL><LI><a href="nltest.htm">Le Domaine expérimental
(Introduit à votre propre risque. ..)</a></UL>
<br><UL><LI><a href="llab.htm">Laboratoire de
langue</a></UL>
<br><UL><LI><a href="mailtran.htm">Envoyer un message par
courrier électronique la Traduction</a></UL>
<br><UL><LI><a href="webtrans.htm">La Traduction de Page
de toile</a></UL>
<center><h1></h1></center>
<br><img
src="file:///n|/iowebsrv/server/8100~1.1/server~1/image/fracmtn.jpg" height=80 width=106>
<h1>Propositions</h1>
<br><UL><LI><a
href="http://jlammers/n:\projects\proposal\rose_gl.doc"> Verres Elevé-Colorés</a></UL>
<center><h1></h1></center>
```

FROM FIG-6B

```
<br><img
src="file:///n|/iowebsrv/server/8100~1.1/server~1/image/isle.jpg"
height=80 width=106>
<h1>Les points d'Intérêt</h1>
<br><UL><LI><a
href="http://www.willamette.edu:80/~tjones/Language-Page.html">La Page
de Langues Humaine</a></UL>
<br><UL><LI><a href="http://www.ai.mit.edu">MIT le
Laboratoire d'Intelligence Artificiel</a></UL>
<center><h1></h1></center>
<br><img
src="file:///n|/iowebsrv/server/8100~1.1/server~1/image/mailto.gif"
height=20 width=27>
<p>Les commente/questions d'envoi à: </p>
<br><a href="mailto:jlammers@csi.compuserve.com">NLT Boîte à
lettres</a>
</body>
</html>
```

FIG-6C

INTEGRATED MULTILINGUAL BROWSER

CROSS-REFERENCE TO RELATED APPLICATIONS

This application is a continuation of U.S. patent application Ser. No. 08/555,916, titled INTEGRATED MUTILINGUAL BROWSER, filed Nov. 13, 1995, now U.S. Pat. No. 6,993,471.

BACKGROUND AND SUMMARY OF THE INVENTION

The present invention relates generally to the field of electronic communication over a computer network. Particularly, the present invention relates to the expansion of multi-lingual electronic communication through translation services for documents and messages available through the Internet.

The recent surge in media attention to the Internet, and especially the World Wide Web, coupled with the continuing growth in home PC ownership have resulted in a growing diversity of the Internet user population. No longer is the Internet the province of software experts; thousands of novice users have begun to come online each day. Software like CompuServe's Web Browser lets users quickly connect to and find useful content online. This phenomenon is not restricted to the United States or to English-speaking countries. Growth in online usage in Europe and Asia is increasing even more quickly than in the U.S.

While interest in the online world is at a peak, a significant obstacle exists to broad usage of the Internet for non-English speakers. The vast majority of Internet content is in English, and is therefore inaccessible to users with other native languages. Translation of Internet documents by a human translator is not a practical solution for two reasons. First, human translation is costly and slow. A translator can typically produce 300-400 words per hour at costs of 12¢ per word or more. Second, in order to have a translator convert Internet documents to the user's native language, the user would have to download every document he was interested in to provide it to the translator. This is a time-consuming process, and if the user knows no English, he will not even be able to assess the relevance of the document before downloading it. This would result in wasted time and translation costs since inevitably, some of the documents selected will not prove to be worthwhile.

The present invention allows non-English speaking Internet users to access and understand information available from the World Wide Web and related sources. Language translation software (known as machine translation, or MT) is combined with Internet software to allow non-English speaking Internet users to quickly generate translations of online text. The process is automated and therefore, less costly and time-consuming than human translation. Advantages of the present invention are explained further in relation to the following detailed description of the invention, drawings, and claims.

BRIEF DESCRIPTION OF THE DRAWINGS

FIGS. 2A and 2B comprise an example of a hypertext document;

FIGS. 3A-3C comprise an example of a hypertext document preprocessed according to the method of the present invention;

FIGS. 5A-5D comprise an example of a preprocessed hypertext document translated according to the method of the present invention;

FIGS. 6A-6C comprise an example of a translated hypertext document postprocessed according to the method of the present invention;

DETAIL DESCRIPTION OF PREFERRED EMBODIMENT(S)

Figure 1A:
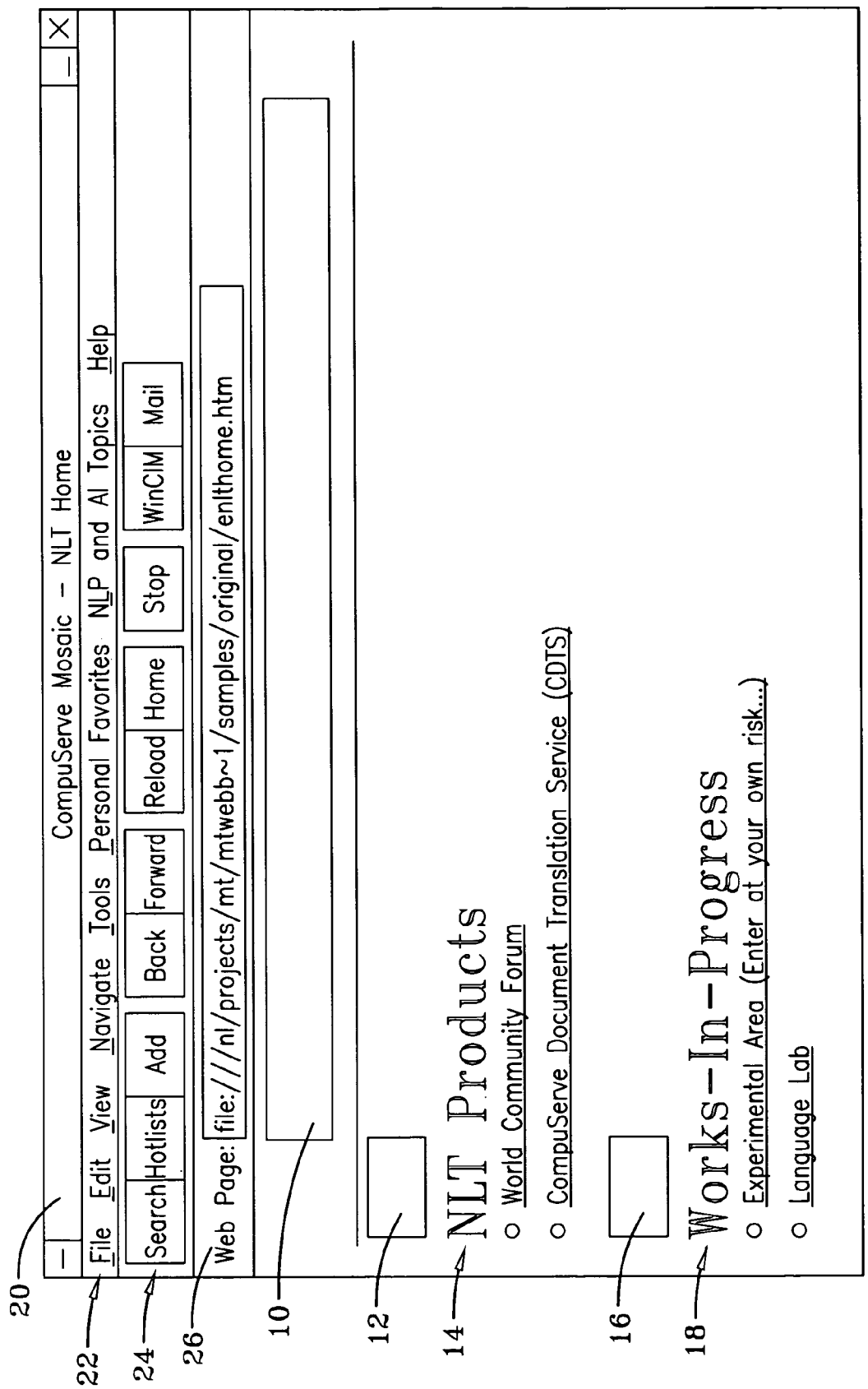
FIGS. 1A and 1B comprise a screen shot of a World Wide Web page.

Although the detailed description of a preferred embodiment focuses on automatic translation of World Wide Web pages, the concept is adaptable to documents obtained from other sources.

The World Wide Web (WWW or the Web) is a distributed information system that may be accessed through a number of sources. It is comprised of software and a set of protocols and conventions. Information on the Web may be accessed using a browser program such as CompuServe's Web Browser. Browsers allow users to read documents and to locate documents from other sources. They present an interface for interacting with the system and they process requests on behalf of the user.

Information providers on the WWW make their information available through programs that understand the HyperText Transfer Protocol (HTTP). Browsers assist users in "visiting" Web sites where information is stored. Information is displayed in pages of text and graphics called "Web Pages." An example of a Web page as viewed through CompuServe's Web Browser is provided in FIGS. 1A and 1B. The Web page shown in FIGS. 1A and 1B contains both text 14, 18 and graphics 10, 12, 16. The title bar 20, menu options 22, buttons 24, and document information 26 appearing at the top of the screen are part of the browser used to view the Web page.

In most cases, information providers make information available through a Web server. The server responds to information requests by delivering the requested information to the user's browser for viewing. Some providers may make their information available through a proxy server that converts information in one format to the format expected and understood by the browser.

Documents available on the WWW and displayed by browsers are hypertext documents. Hypertext is text that contains references (or "links," "hyperlinks," or "hot spots") to other documents. The reference is similar to a footnote except the referenced document may be accessed directly from the original document. The related document may be viewed by selecting or clicking the mouse on the reference. The process of selecting hyperlinks to view referenced documents may be referred to as "traversing the hyperlinks." Unlike a footnote, references usually do not appear as shorthand descriptions of related documents. Instead, references may be indicated by a combination of graphics, different fonts, different colors for the text, underlining, the mouse pointer turning into a hand, etc. The referenced documents may reside on different computers at different Web sites.

Hypertext documents are written in a "markup language" call Hypertext Markup Language (HTML). HTML actually refers to both a document type and the markup language that represents instances of the document type. A hypertext document contains general semantics appropriate for representing display or presentation characteristics as well as information from a wide ranges of domains. A hypertext document consists of a sequence or stream of characters that comprise both data characters and markups. Markups are syntactically delimited characters (such as "<," ">," "#," etc.) added to the data characters to define the document's structure. Markups thus have special meanings and may represent such things as hypertext, news, mail, documentation, menus of options, and in-line graphics. Markups may be combined with other characters or related values to create codes that also have special meaning. Data characters are those characters in the document that are not codes.

Figure 1B:
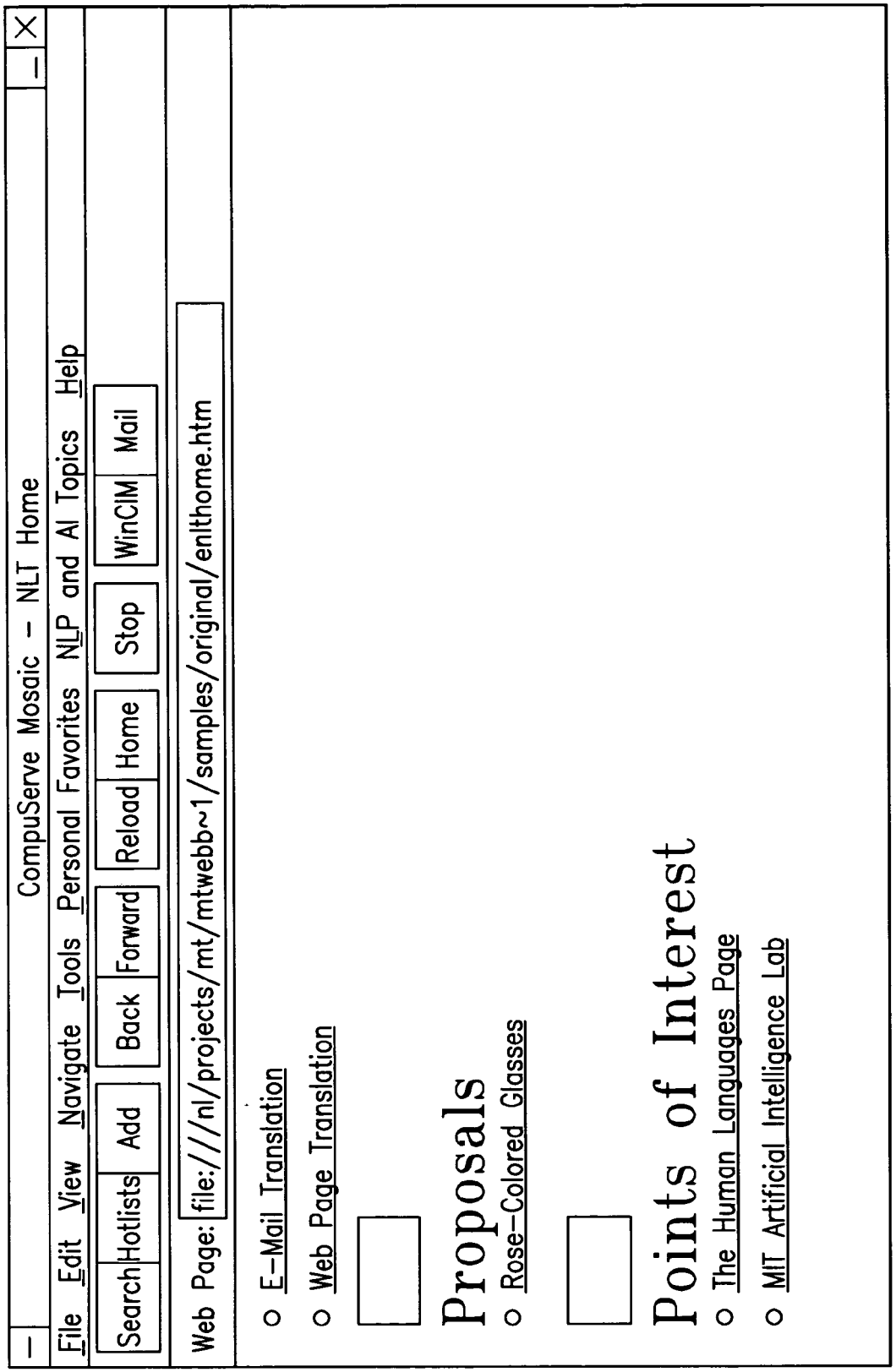

FIGS. 2A and 2B comprise the hypertext document that describes the Web page shown in FIGS. 1A and 1B. FIGS. 2A and 2B show the markups and related words (that comprise codes) as well as data characters that may appear in a hypertext document. For example, the characters "<" and ">" appearing throughout the document are markups. The characters "<" and ">" combined with the word "head" ("<head>") 30 may be considered a code. Finally, the text "NLT Home" 30 that is not surrounded by markups or codes may be considered data characters.

As indicated by the brief description, HTML documents have a well-defined and documented structure defined by a grammar. The codes in a HTML document convey important information regarding both the display or presentation of the document itself as well as related references and commands. Display and presentation information may include color information, information about graphics that appear on the page, information about text that appears on the page, etc. A HTML document is structured as a series of elements that are identified by the language markups and codes. A document includes a head (consisting of a title and other optional elements) and a body that is a text flow of paragraphs, lists, images, and other elements. The various parts of the document may be identified by looking at the markups or codes in the document. For example, referring again to FIGS. 2A and 2B which show the hypertext for FIGS. 1A and 1B, the document head contains the title "NLT Home" 30. An image contained in the document is identified in the line "<br><img src="file:///nl/iowebsrv/server/8100~1.1/server~1/image/ntl.jpg" height=60 width=640></center>" 32.

As may be apparent, the process of translating a HTML document requires examination of each character in document. Characters may be examined individually and in combination to determine whether they are markups, codes, or data characters. To process a document, the processing software examines the character stream that comprises the document. The steps needed to translate a HTML document from one language to another may be summarized as follows:

Preprocess the HTML document by placing boundary markers around HTML codes to be preserved during the translation process. The translation software recognizes the boundary markers and does not translate text and symbols appearing between the markers.

Translate the preprocessed HTML document from the original language to the target language.

Postprocess the translated HTML document to remove the boundary markers.

Step 1. The codes in a HTML document convey important information describing the characteristics of the Web page. Referring again to FIGS. 2A and 2B, an example of the type of information contained in a hypertext document is shown. Certain information contained in the document of FIGS. 2A and 2B may be interpreted by a Web browser so that to the browser user, the images shown in FIGS. 1A and 1B appear. Certain information in the hypertext document is preserved during the translation process so that the translated page has, in general, the same appearance and behavior as the original page. Because HTML documents have a well-defined and known structure described by a grammar, automated translation of a HTML document is possible. The codes in the document may be discerned by the preprocessing software. Special boundary markers placed in the document by the preprocessing software indicate to the translation software that the intervening text should not be translated. Consequently, the resulting page may have the same appearance and behavior as the original page.

Referring to FIGS. 3A-3C, an example of a preprocessed HTML document is shown. The HTML document of FIGS. 3A-3C is the preprocessed version of the HTML document shown in FIGS. 2A and 2B. In this example, the boundary markers used to identify the HTML codes are the character pairs "{." and ".}". Any character or character combination that does not normally occur in text may be used as a boundary marker. The line that appeared as "<head><title>NLT Home<title><head>" in FIG. 2A (30) is preprocessed in Step 1 to the line "{.<head>.}{.<title>.}NLT Home{.<title>.}{.<head>.}" in FIG. 3A (40). Other lines in the document are preprocessed similarly.

Figure 4:
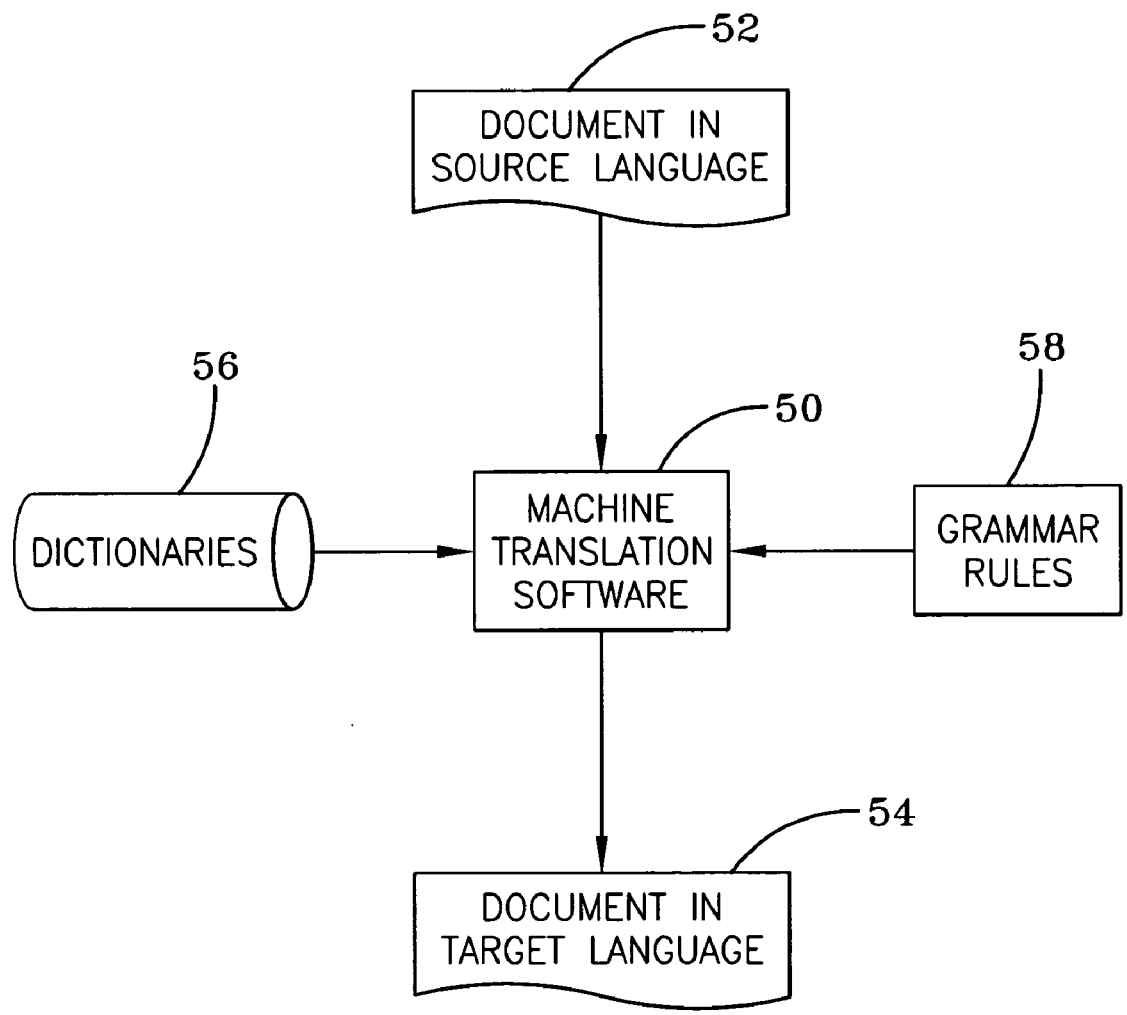
FIG. 4 illustrates a system for performing machine translation.

Step 2. Machine Translation (MT) software performs the translation of text from one language to another language. There are many commercially available MT software packages. FIG. 4 is an illustration of a system in which MT software 50 takes as input text in one language 52 and generates a rough draft translation of the text in another language 54 using an electronic dictionary 56 and a set of linguistic and/or statistical rules encoded in the program 58. MT software can perform language conversion operations very quickly; in some cases, at speeds of up to 3,000 words per minute. The translated texts are not high quality translations, but they are usually adequate for understanding what the document is about.

Referring to FIGS. 5A-5D, an example of a translated HTML document is shown. The HTML document of FIGS. 5A-5D is the translated version of the preprocessed HTML document shown in FIGS. 3A-3C. As described above, the boundary markers used to identify the HTML codes are the character pairs "{." and ".}". Consequently, the MT software ignores all text that falls between the boundary markers. Data characters that are not surrounded by boundary markers are translated by the MT software. The preprocessed line that appeared as "{.<head>.}{.<title>.}NLT Home{.<title>.}{.<head>.}" in FIG. 3A (40) is translated in Step 2 to the line "{.<head>.}{.<title>.}NLT Maison{.<title>.}{.<head>.}" in FIG. 5A (60).

Figure 7A:
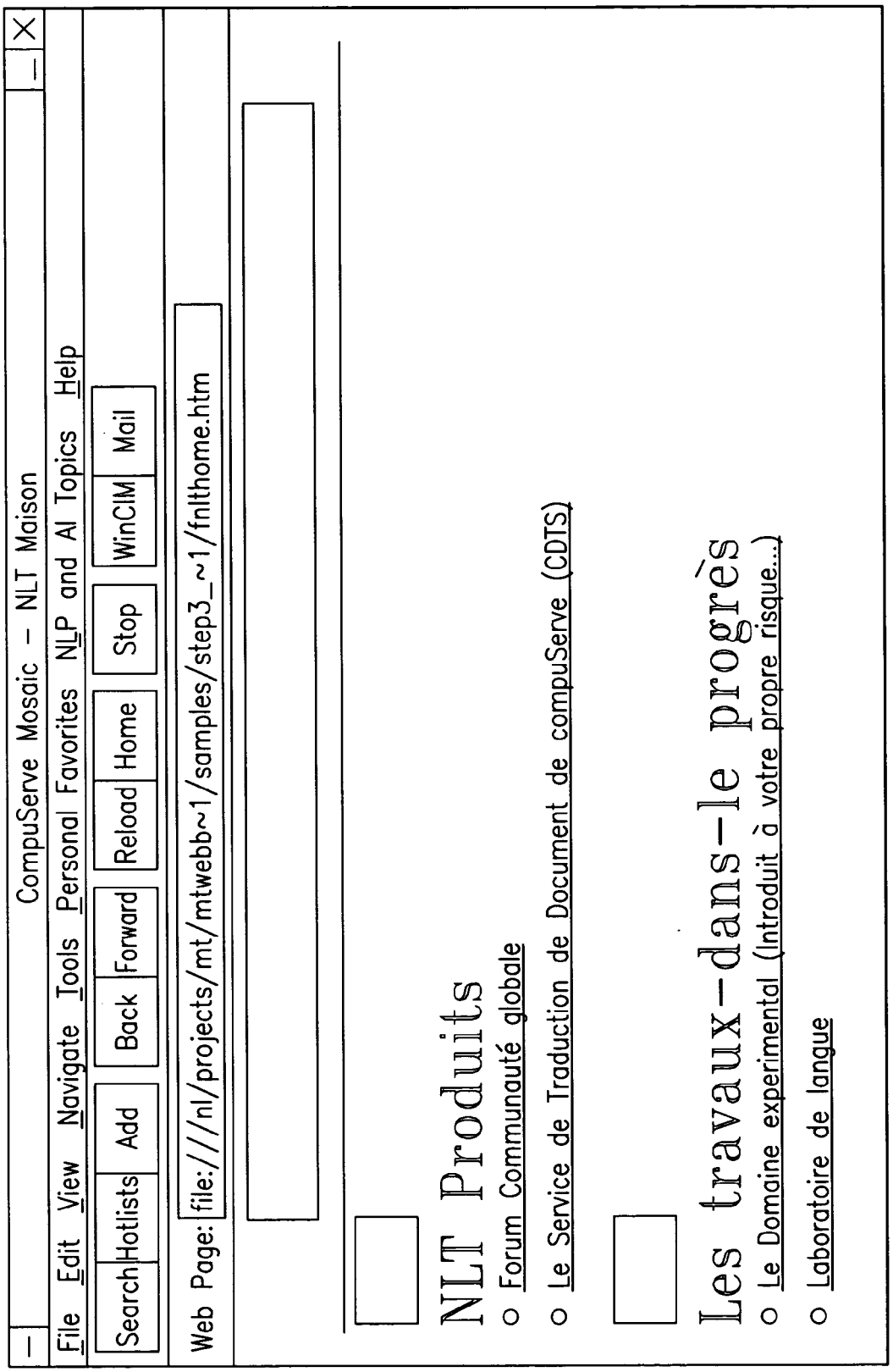
FIGS. 7A and 7B comprise a screen shot of a World Wide Web page that has been translated according to the method of the present invention.
Figure 7B:
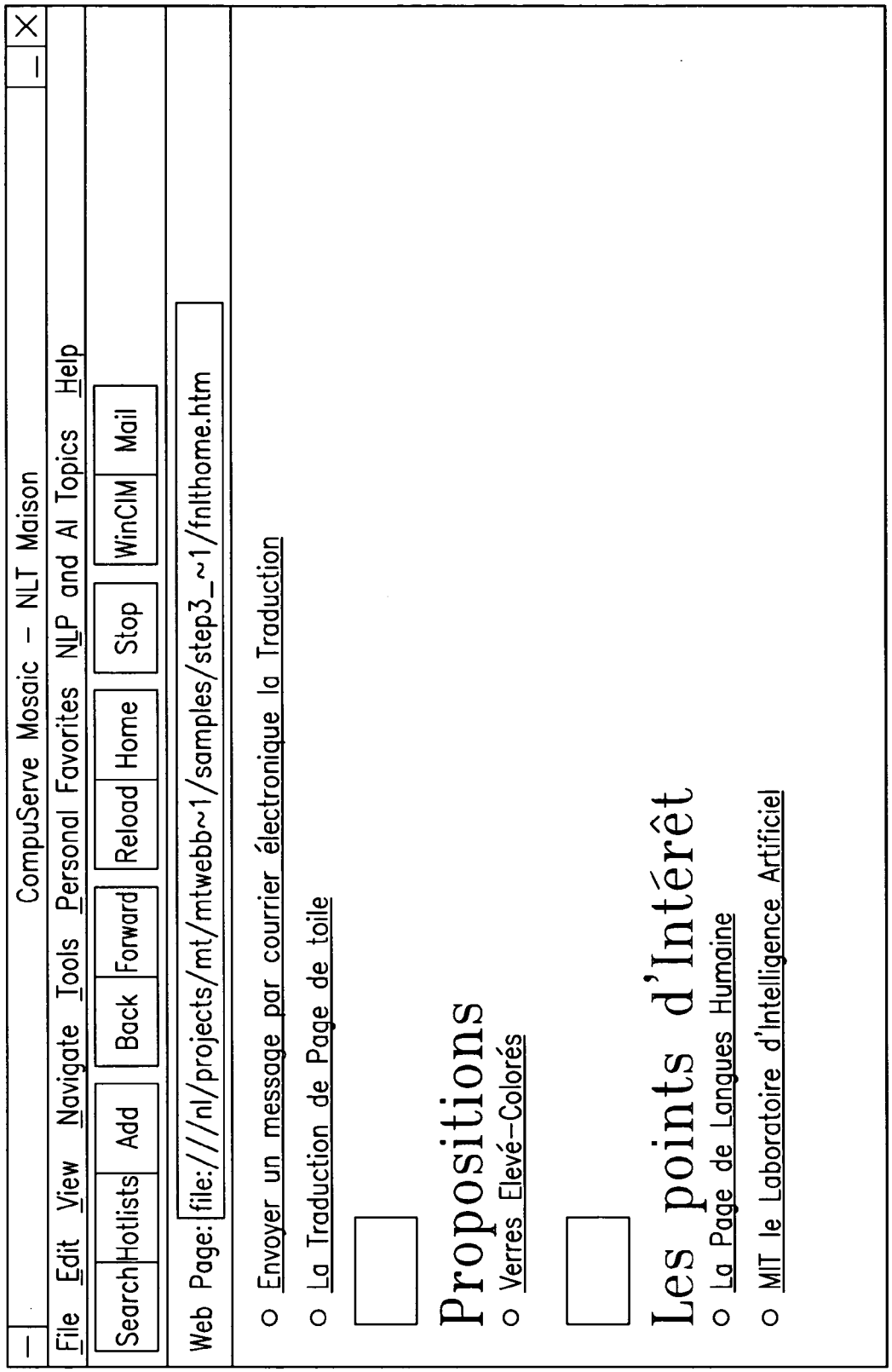

Step 3. In the final step, postprocessing software removes boundary markers from the translated document. Referring to FIGS. 6A-6C, an example of a postprocessed HTML document is shown. The HTML document of FIGS. 6A-6C is the postprocessed version of the translated HTML document shown in FIGS. 5A-5D. As described above, the boundary markers used to identify the HTML codes are the character pairs "{." and ".}". During postprocessing, these boundary markers are removed. The translated line that appeared as "{.<head>.}{.<title>.}NLT Maison{.<title>.}{.<head>.}" in FIG. 5A (60) is postprocessed in Step 3 to the line "<head><title>NLT Maison<title><head>" in FIG. 6A (70). The postprocessed HTML document of FIGS. 6A-C may then be displayed by the browser as shown in FIGS. 7A and 7B.

Figure 8:
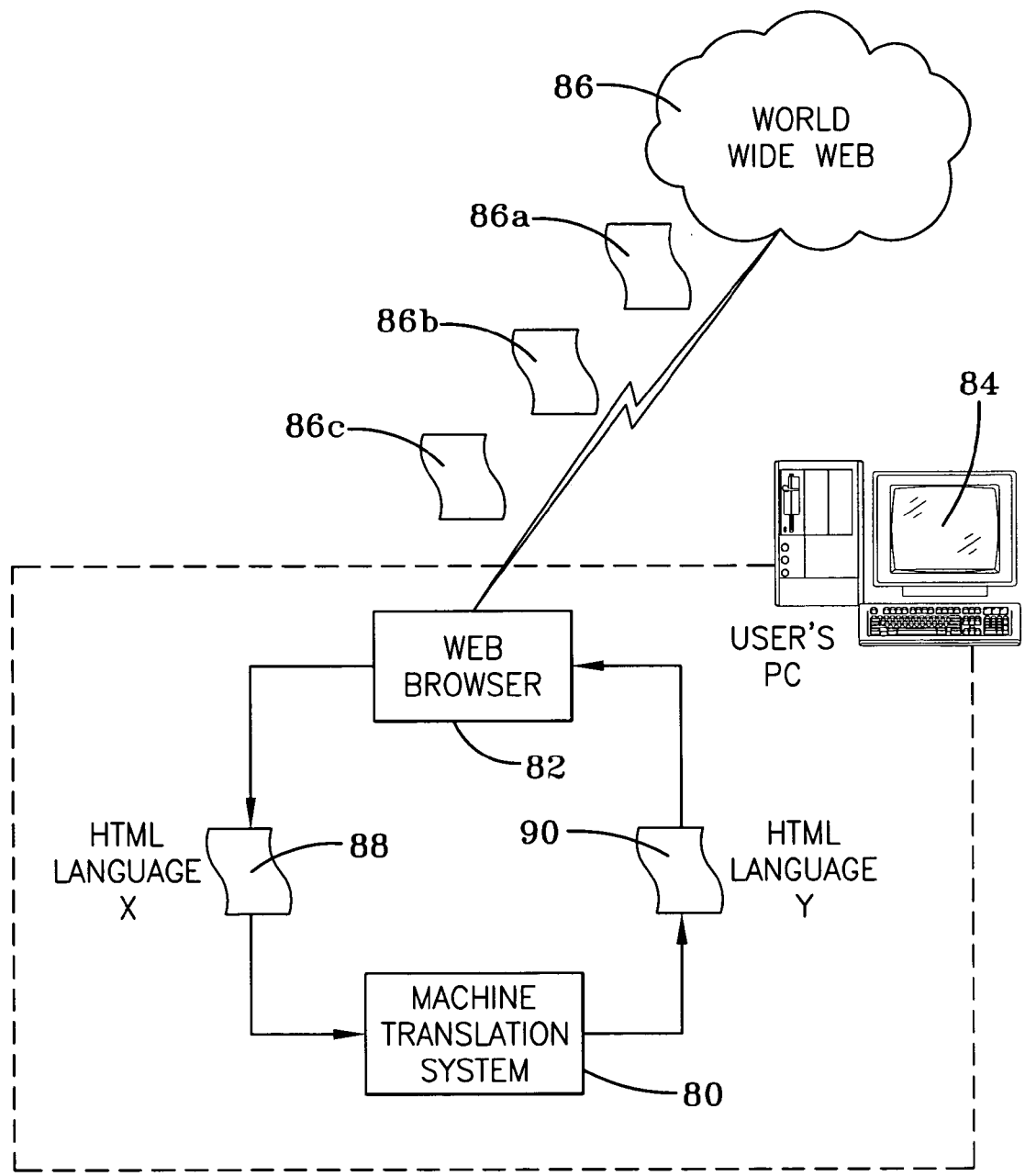
FIG. 8 is a diagrammatic view of one embodiment of the present invention in which machine translation is integrated into a Web browser.

FIG. 8 is a diagrammatic view of one embodiment of the present invention in which machine translation is integrated into a Web browser. MT software 80 may be combined with a browser 82 to allow the user 84 to rapidly and automatically translate online documents from the World Wide Web 86 into his native language. The MT software 80 may be bundled with the browser 82 to form an integrated multilingual browser. The user 84 of the multilingual browser 82 selects the desired target language, (e.g. French if the user speaks French), and the Web document retrieved by the browser 88 may be rapidly translated on-the-fly with a mouse click. The Web Browser 82 then displays for the user 84 the translated document 90. Optionally, the user may be able to update and edit parts of the MT software's electronic dictionaries to include terminology common to the Web sites he visits.

Although a document may be translated at the time that a user requests access to the document, a document may also be "pre-translated" and stored in a cache for later retrieval before a user seeks access to it. Documents that have been accessed at least once may also be stored following translation. The advantage of storing documents that have been translated is that delivery time to the user may be reduced. Although storing documents requires disk space, it may represent a better use of system resources because documents that are accessed frequently are translated once rather than every time they are accessed.

Figure 9:
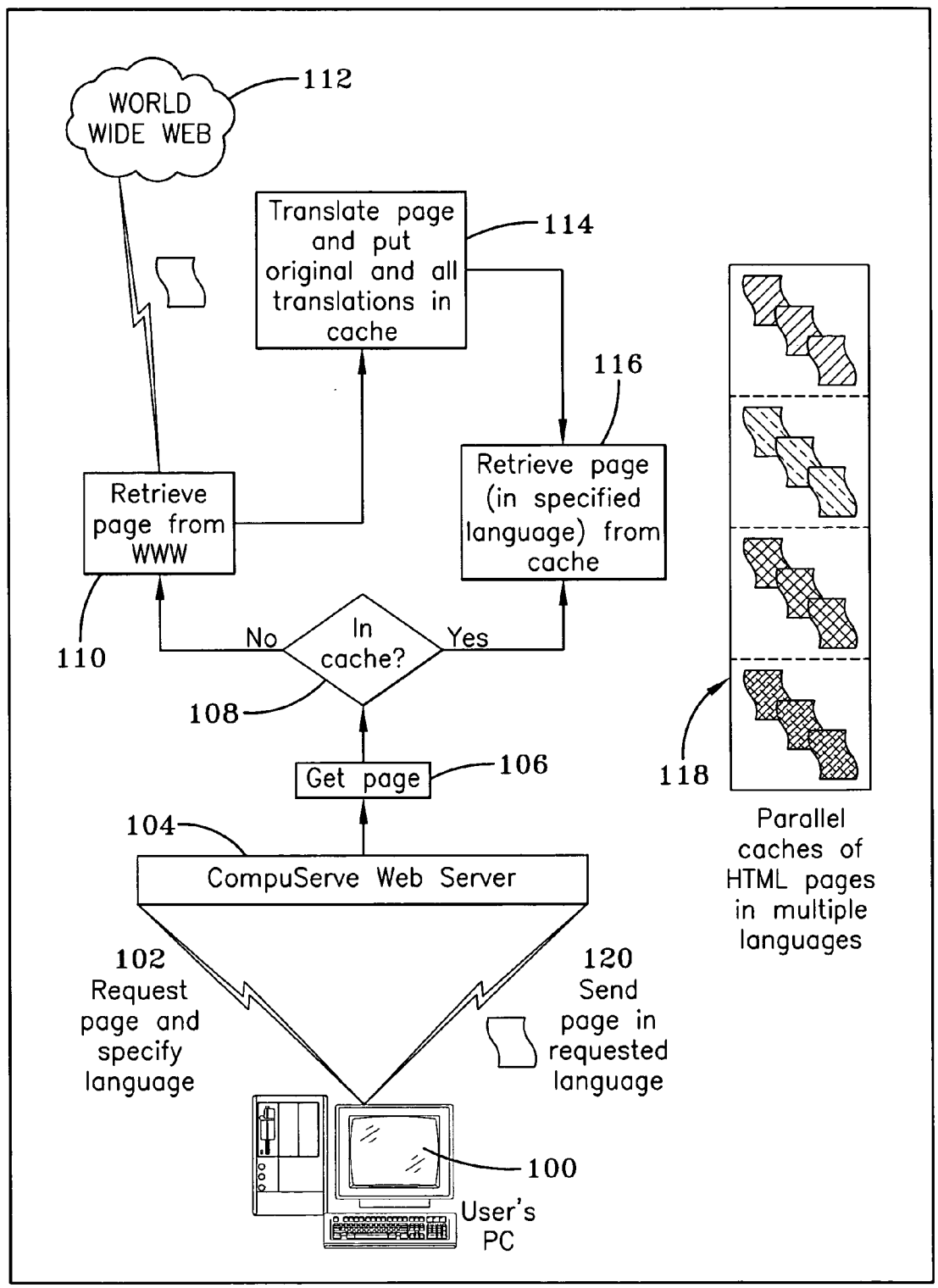
FIG. 9 is a diagrammatic view of one embodiment of the present invention in which pre-translated Web pages are accessible from a server.

FIG. 9 is a diagrammatic view of an alternative implementation in which pre-translated Web pages are stored on a Web server 104. The translation software resides on a translation server 104 (possibly the same machine as the Web server). Popular Web pages 114 are pre-translated and stored in a cache 118, with additional pages being added as they are requested by users 100. The cache is a dynamic storage device with a finite capacity. New, pretranslated pages are added to the cache, but pages will also be removed from the cache if they are used infrequently or if there are constraints on storage capacity.

In accessing the system, a user 100, sends to the Web Server 104 a request for a specific page in a specific language 102. The Web Server 104 then sends a request to get the desired page 106. The method for servicing the request depends on where the page is located. If the page has been pre-translated 114 and stored in the cache of pages in multiple languages 118 it is retrieved from the cache 116 and returned to the user in the requested language 120. If the page has not been pre-translated, then the page is retrieved 110 from the World Wide Web 112, translated into the requested language, and cached before being sent to the user 120.

Translation of Web pages, in either the bundled browser/MT configuration or the Web Server configuration, requires processing of HTML codes containing reference, command, and display information. Preferably, the HTML codes are identified prior to translation, then surrounded by special boundary markers to block the translation process on the codes. The HTML preprocessor uses its knowledge regarding the markups, codes, data characters and the structure of HTML documents to determine which codes should be blocked from the translation process. After translation is complete, a postprocessing program removes the special boundary markers so that the necessary references, commands, and display characteristics are available in the translated text.

The primary objective of the present invention is to allow a user of the Internet to read hypertext documents that are available only in a language foreign to the user. The readable text of the hypertext document is changed in accordance with the user's preferred language. Steps are taken to preserve the document's appearance and behavior so that the only noticeable difference between the original document and the translated document is the language of the text. Users may interact with the translated document and reference related documents in the same manner that users interact with the original document.

What is claimed is:

1. A system for providing automated translations of documents on a network comprising: machine translation software 1) that translates text of a source document in a source language to text for a target document in a target language wherein each of the source documents comprises a reference to another source document for accessing the referenced source document when the reference is selected and 2) integrates into the target document the reference from the source document;
   a server on the network receiving client requests for source documents, invoking the machine translation software to translate source documents into target documents, and delivering target documents to client computers;
   a first client requesting a first source document in a source language, the first client request received by the server from a client computer;
   a first target document delivered from the server to the client computer;
   the first target document translated by the machine translation software from the first source document in the source language to the first target document in a target language and including a reference from the first source document;
   a second client request for a second source document in the source language, the second client request received by the server from a client computer in response to a user's selection of the reference in the first target document; and
   a second target document delivered from the server to the client computer, the second target document translated by the machine translation software from the second source document in the source language to the second target document in the target language and including a reference from the second source document.

2. The system of claim 1 wherein each source document and each target document is selected from the group consisting of an HTML document and a web page.

3. The system of claim 1 wherein the target language is specified by the user via a web browser.

4. The system of claim 1 wherein the reference integrated into each target document comprises the reference from the source document.

5. The system of claim 1 wherein the machine translation software comprises:
   (a) pre-processing software that identifies codes in the source documents not to be translated;
   (b) translation software that translates the text of the source documents from the source language into the target language; and (c) post-processing software that integrates the untranslated codes into the translated text in the target language.

6. The system of claim 1 further comprising a cache for storing the target documents.

7. The system of claim 6 further comprising:
a third client request for a third source document in the source language, the second client request received by the server from the client computer in response to a user's selection of the reference in the second target document; and
a third target document delivered from the server to the client computer, the third target document retrieved by the server from the cache.

8. A method for providing translated documents to a user of a computer network comprising:
providing the user with access to source documents in a source language, each of the source documents comprising a reference to another source document for accessing the referenced source document when the reference is selected;
receiving a user's first request for a first source document on the network;
translating the first source document from the source language to a first target document in a target language that includes a reference from the first source document;
providing the first target document to the user;
receiving a user's second request for a second source document on the network, the second request received in response to the user's selection of the reference in the first target document;
translating the second source document from the source language to a second target document in the target language that includes a reference from the second source document; and
providing the second target document to the user.

9. The method of claim 8 wherein translating the first source document from the source language to a first target document in the target language is performed at a computer selected from the group consisting of a user's computer and a server.

10. The method of claim 8 further comprising caching the target documents.

11. The method of claim 8 wherein the reference included in each target document comprises the reference from the source document.

12. The method of claim 8 wherein each source document and each target document is selected from the group consisting of an HTML document and a web page.

13. The method of claim 8 wherein the target language is specified by the user via a web browser.

14. The method of claim 8 wherein the translating the source document comprises:
(a) pre-processing the source document to identify codes in the source document not to be translated;
(b) translating the text of the source document from the source language into the target language; and
(c) post-processing the target document to integrate the untranslated codes into the translated text in the target language.

15. The method of claim 8 further comprising caching the target documents for later retrieval.

16. The method of claim 15 further comprising:
receiving a third client request for a third source document in the source language, the third client request received in response to a user's selection of the reference in the second target document; and
providing a third target document to the user, the third target document retrieved from the cache.

17. A system for providing translated documents to a user of a computer network comprising:
a client computer used by the user and
a) requesting a first source document in a source language, the first source document comprising a reference to a second source document in the source language document thereby accessing the second source document when the reference is selected by the user;
b) receiving the first source document in a target language, the first source document in the target language comprising the reference to the second source document in the source language;
c) selecting the reference in the first source document in the target language to request the second source document in the source language; and
d) receiving second source document in the target language when the reference is selected; and
a computer on the network
a) processing user requests from the client computer for the first source document in the source language and the second source document in the source language; and
b) delivering to the user the first source document in the target language and the second source document in the target language, the second source document delivered to the user in response to the user's selection of the reference in the first source document in the target language.

18. The system of claim 17 wherein the computer on the network for processing user requests from the client computer for the first source document in the source language and the second source document in the source language and delivering to the user the first source document in the target language and the second source document in the target language is selected from the group consisting of a user's computer and a server on the network.

19. The system of claim 17 wherein the first source document in the target language and the second source document in the target language are delivered to the user from a storage area of translated documents.

20. The system of claim 19 wherein the storage area comprises a cache of translated documents that have been accessed previously.

21. The system of claim 19 wherein the storage area comprises pre-translated documents.

22. The system of claim 17 wherein each of the first and second source documents in the source language and the first and second source documents in the target language are selected from the group consisting of an HTML document and a web page.

23. The system of claim 17 wherein the target language is selected by the user via a web browser.

24. A method for providing translated documents to a user of a computer network comprising:
receiving a user's first request for a first source document on the network, wherein the first source document comprises text in a source language and a first traversable link to a second source document comprising text in the source language;
creating a first target document by translating the text in the first source document from the source language to a target language;
providing the first target document to the user;
in response to a selection by the user of a traversable link in the first target document, obtaining the second source document;

creating a second target document by translating the text in the second source document from the source language to the target language; and providing the second target document to the user.

25. The method of claim 24 wherein obtaining the second document comprises traversing the first traversable link.

26. The method of claim 24 wherein obtaining the second document comprises traversing the traversable link in the first target document.

27. The method of claim 24 wherein the traversable link in the first target document is the same as the first traversable link.

28. The method of claim 24 wherein creating the first target document and the second target document is performed at a computer selected from the group consisting of a user's computer and a server.

29. The method of claim 24 wherein each source document and each target document is selected from the group consisting of an HTML document and a web page.

30. The method of claim 24 wherein the target language is specified by the user via a web browser.

31. The method of claim 24 wherein the creating a target document comprises:
- (a) pre-processing the source document to identify codes in the source document not to be translated;
- (b) translating the text of the source document from the source language into the target language; and
- (c) post-processing the target document to integrate the untranslated codes into the translated text in the target language.

* * * * *